US007837608B2

(12) United States Patent
Klapper et al.

(10) Patent No.: US 7,837,608 B2
(45) Date of Patent: Nov. 23, 2010

(54) METHOD AND DEVICE FOR PREVENTING BLOCKAGES IN THE FLOW PATHS OF A SEPARATOR

(75) Inventors: Siegfried Klapper, Herrzebrock-Clarholz (DE); Ludger Bähner, Oelde (DE)

(73) Assignee: Westfalia Separator AG, Oelde (DE)

( * ) Notice: Subject to any disclaimer, the term of this patent is extended or adjusted under 35 U.S.C. 154(b) by 1102 days.

(21) Appl. No.: 10/583,563

(22) PCT Filed: Oct. 30, 2005

(86) PCT No.: PCT/EP2004/012319

§ 371 (c)(1),
(2), (4) Date: Jun. 19, 2006

(87) PCT Pub. No.: WO2005/065835

PCT Pub. Date: Jul. 21, 2005

(65) Prior Publication Data
US 2007/0082802 A1 Apr. 12, 2007

(30) Foreign Application Priority Data
Dec. 23, 2003 (DE) ................. 103 61 520

(51) Int. Cl.
*B04B 13/00* (2006.01)
(52) U.S. Cl. ................. 494/37; 494/2; 494/10; 494/11; 426/491
(58) Field of Classification Search ............ 494/1, 494/2, 10, 11, 23, 27, 37; 426/231, 491, 426/586; 99/452, 456
See application file for complete search history.

(56) References Cited

U.S. PATENT DOCUMENTS

| | | | | |
|---|---|---|---|---|
| 2,264,665 A * | 12/1941 | Hall | ............... | 426/417 |
| 2,423,834 A * | 7/1947 | Horneman et al. | ......... | 426/417 |
| 2,542,456 A * | 2/1951 | Ayres | ............... | 494/2 |
| 2,628,023 A * | 2/1953 | Dahlstedt | ........... | 494/2 |
| 2,717,119 A | 9/1955 | Jones | | |
| 2,837,271 A * | 6/1958 | Haglund | ........... | 494/10 |
| 3,379,370 A * | 4/1968 | Anderson | ........... | 494/11 |
| 3,656,685 A * | 4/1972 | Kjellgren | ........... | 494/42 |
| 3,829,584 A * | 8/1974 | Seiberling | ......... | 426/231 |
| 3,924,804 A * | 12/1975 | Niemeyer | ........... | 494/37 |
| 3,946,113 A * | 3/1976 | Seiberling | ......... | 426/231 |
| 3,983,257 A * | 9/1976 | Malmberg et al. | ......... | 426/231 |
| 4,017,643 A * | 4/1977 | Lester | ........... | 426/231 |
| 4,074,622 A * | 2/1978 | Niemeyer | ........... | 99/456 |
| 4,075,355 A * | 2/1978 | Pato | ........... | 426/231 |
| 4,151,950 A | 5/1979 | Gunnewig | | |
| 4,689,157 A * | 8/1987 | Tenthoff | ............ | 210/787 |

(Continued)

FOREIGN PATENT DOCUMENTS

DE 691 386 5/1940

(Continued)

*Primary Examiner*—Charles E Cooley
(74) *Attorney, Agent, or Firm*—Barnes & Thornburg LLP

(57) ABSTRACT

A method of preventing blockages of flow paths of a separator, the separator processing a fat-containing product such as milk. The method steps include determining a concentration of the fat content of an outflowing product phase from the separator to detect an imminent clogging, and shifting a separation zone in a separator drum of the separator for a defined minimum time period by changing operating parameters.

14 Claims, 2 Drawing Sheets

U.S. PATENT DOCUMENTS

| | | | | |
|---|---|---|---|---|
| 4,755,165 | A * | 7/1988 | Gunnewig | 494/37 |
| 5,009,794 | A * | 4/1991 | Wynn | 210/739 |
| 5,137,738 | A * | 8/1992 | Wynn | 426/231 |
| 5,260,079 | A * | 11/1993 | Zettier et al. | 426/231 |
| 5,591,469 | A * | 1/1997 | Zettier | 426/231 |
| 5,928,702 | A * | 7/1999 | Lidman et al. | 426/580 |
| 6,468,574 | B1 * | 10/2002 | Zettier | 426/491 |
| 6,475,132 | B2 | 11/2002 | Zettier | |
| 7,217,234 | B2 * | 5/2007 | Zettier | 494/1 |
| 7,758,488 | B2 * | 7/2010 | Zettier et al. | 494/37 |
| 2002/0016245 | A1 | 2/2002 | Zettier | |
| 2004/0187711 | A1 | 9/2004 | Zettier | |
| 2007/0082802 | A1 * | 4/2007 | Klapper et al. | 494/2 |
| 2008/0279999 | A1 * | 11/2008 | Duchesne et al. | 426/491 |

FOREIGN PATENT DOCUMENTS

| | | |
|---|---|---|
| DE | 991500 | 5/1965 |
| DE | 1 900 592 | 7/1969 |
| DE | 36 01 814 A1 | 7/1987 |
| DE | 36 01 814 C2 | 7/1987 |
| DE | 3814761 A1 * | 11/1988 |
| DE | 44 07 061 C2 | 9/1995 |
| DE | 198 07 294 C1 | 9/1999 |
| DE | 198 20 870 A1 | 11/1999 |
| DE | 200 10 743 U1 | 11/2000 |
| DE | 100 36 085 C1 | 1/2002 |
| DE | 101 35 073 C2 | 2/2003 |
| EP | 0 427 750 B1 | 5/1991 |
| JP | 02224624 A * | 9/1990 |
| WO | WO 9000862 A1 * | 2/1990 |
| WO | WO 03/007700 * | 1/2003 |

* cited by examiner

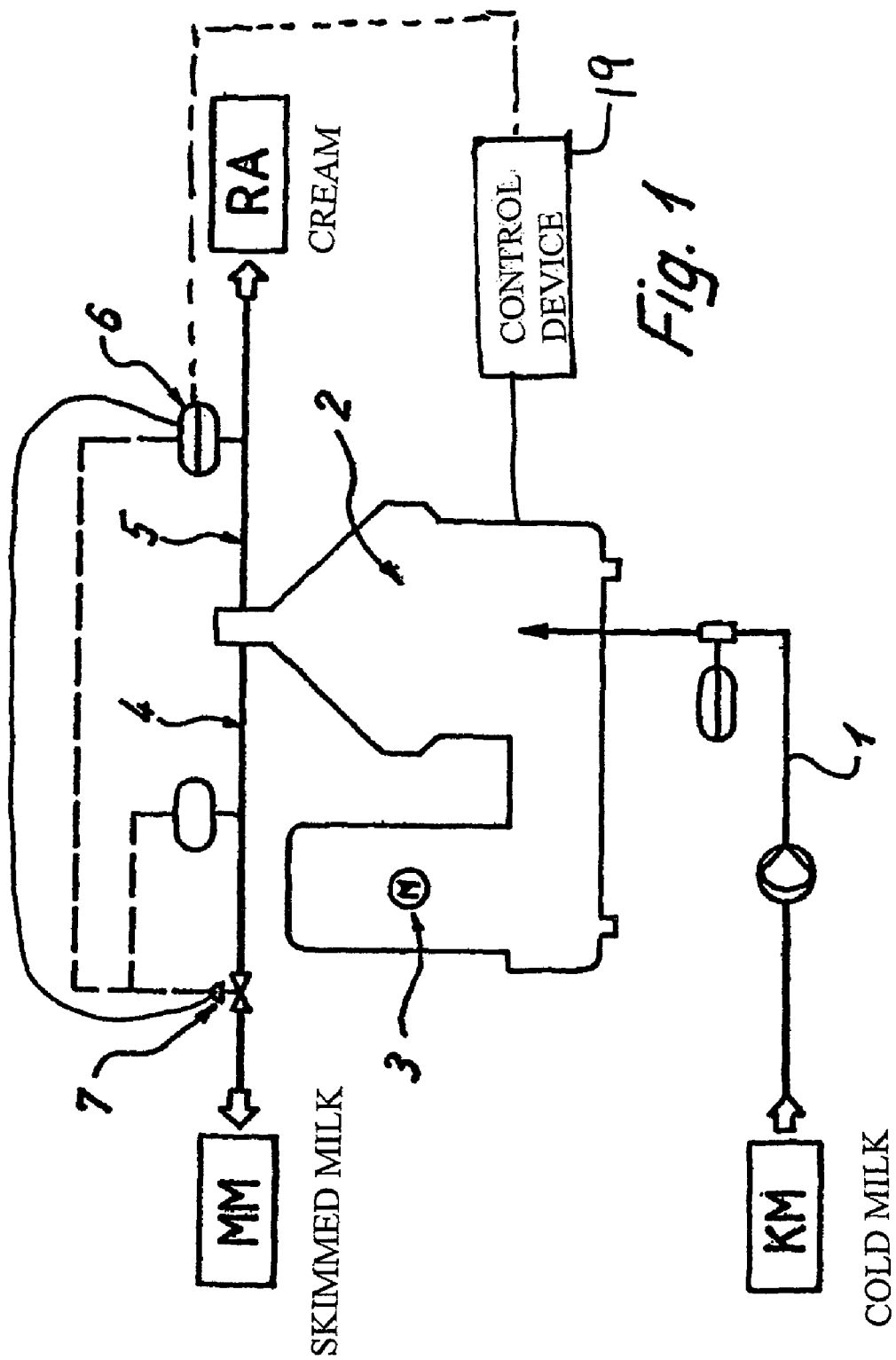

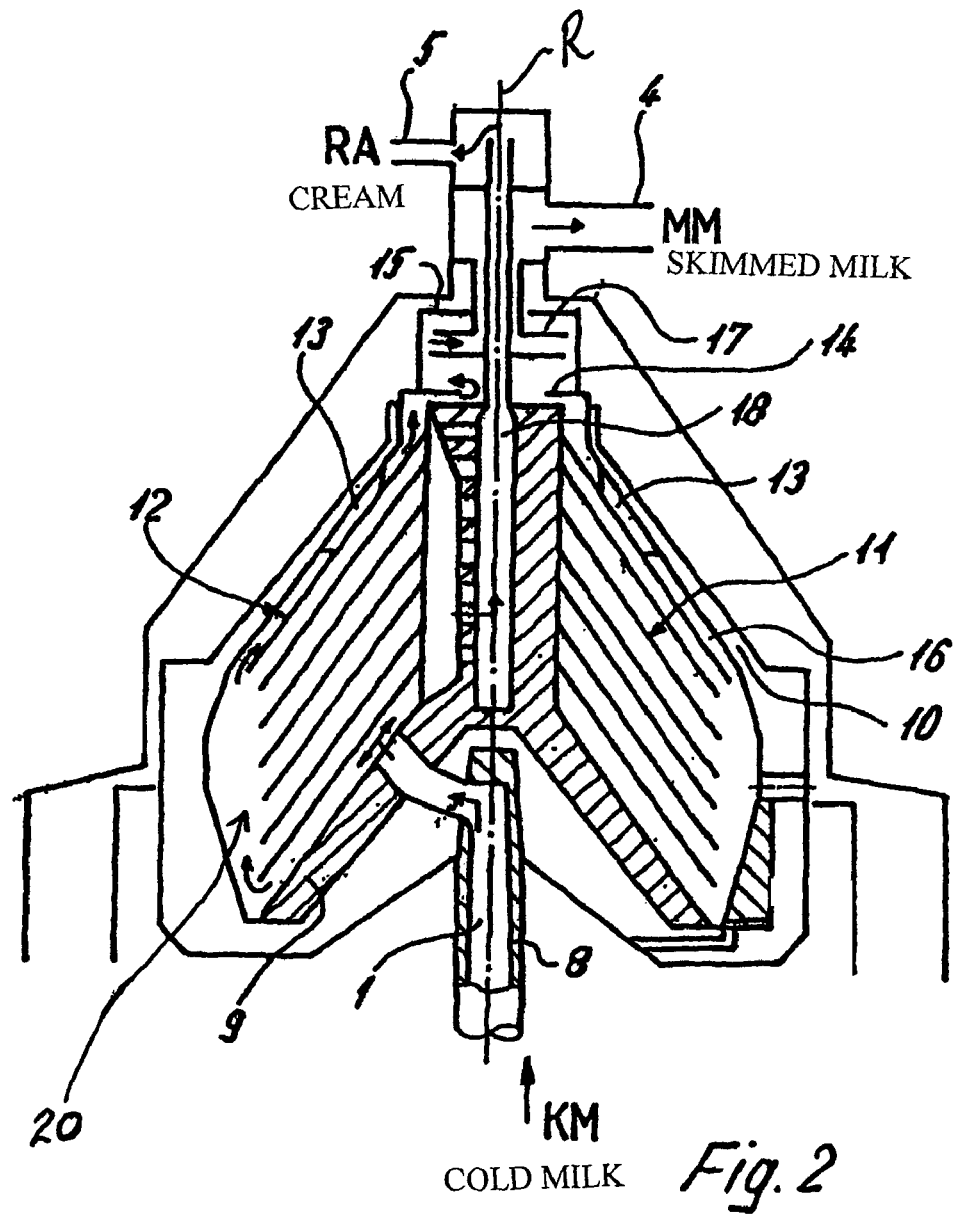

METHOD AND DEVICE FOR PREVENTING BLOCKAGES IN THE FLOW PATHS OF A SEPARATOR

BACKGROUND AND SUMMARY

The present disclosure relates to a method of preventing blockages of the flow paths and flow pipes of a separator when processing a fat-containing initial product. The present disclosure also relates to a device for implementing the method.

In numerous food-processing enterprises, separators are used for many different applications and performance spectrums. The separators generally have to be adapted to these different requirements with respect to their construction and design. Although, as a result, they can be used within the predefined task field or process, they react sensitively and often as disturbances to performance changes or changes of the composition of the products to be processed.

With respect to the sterilization of whey, it is known from German Patent Document DE 100 36 085 to separate the raw whey into cream whey, skimmed whey or skimmed milk, and solids, sediment with germs, constituents. A centrifugal separation in the separator takes place such that the fat content in the cream whey amounts to more than 45%. The skimmed milk is sterilized and is then returned into the cream whey, which was subjected to no further sterilization, and the cream/skimmed milk mixture forms when the skimmed milk is returned to the cream is pasteurized. A high-temperature heating up to 135° C. is not necessary when using this method.

From German Patent Document DE 198 07 294, a skimming station is known which has a clarification separator and a skimming separator connected to the output side of the clarification separator. A recirculation pipe for skimmed whey, for the portion with the reduced fat content, leads from the outlet of the skimming separator to the inlet of the clarification separator, as a bypass piping, in order to minimize the loss of fat and improve the quality of the obtained cheese powder.

German Patent Document DE 198 20 870 suggests that, during the skimming of the whey by a separator, a partial quantity of from 0.5 to 2% of the outflowing whey cream, the portion containing more fat, is returned into the raw whey fed to the separator in order to improve the quality of the product.

During the separation of milk into skimmed milk and cream by separators, blockages of the drum, that is, a clogging of at least one portion of the flow paths or of all flow paths of the separator, may occur because of an excessive fat concentration in the cream whey. Generally, the buttered-out cream clogs the distributor space and/or the disks and/or the cream outlet in the center of the drum and/or the cream discharge connected behind the separator.

If this blockage occurs, the clogging of the flow paths in the separator, the internal flow pipes and flow paths as well as the discharges leading away from the separator, as is known from the state of the art, can be unclogged only by a hot-water feeding via the inlet and a simultaneous throttling of the skimmed milk outflow or an increase of the inflow output, which leads to product losses and thus to disadvantages with respect to cost.

With respect to the state of the art, reference is also made to German Patent Documents DE 101 35 073 C2, DE 36 01 814 C2, U.S. Patent Document 27 17 119, German Patent Document 100 36 085 C1, European Patent Document EP 0 427 750 B1, German Patent Document DE 44 07 061 C2 and German Patent Document DE 200 10 743 U1.

The present disclosure relates to a method by which a threatening clogging of the flow paths can be detected early and can be prevented.

The present disclosure thus relates to a method of preventing blockages of flow paths of a separator, the separator processing a fat-containing product such as milk. The method steps include: determining a concentration of the fat content of an outflowing product phase from the separator to detect an imminent clogging; and, shifting a separation zone in a separator drum of the separator for a defined minimum time period by changing operating parameters when a defined fat content limit value is either reached or exceeded.

Accordingly, the present disclosure relates to a method of preventing a clogging of the flow paths of a separator when processing a fat-containing initial product, such as milk or whey. A concentration of the fat content of an outflowing product phase is determined during an operation and, when a defined fat-content limit value is reached or exceeded, a separation zone in the separator drum is shifted for preventing a clogging by automatically changing the operating parameters.

In this manner, an imminent clogging can be detected early and can be prevented in a very simple fashion, so that rinsing operations, required according to the state of the art, and the resulting losses of product and time are avoided during the production.

Although a method of monitoring, controlling and regulating the operation of a centrifuge is known from German Patent Document DE 101 35 073, according to the method of the present disclosure, skimmed milk is removed at the outlet of the centrifuge by an analyzer. A transparency of the skimmed milk sample is then determined and the fat content is determined. As a function of the determined fat content, the adjustment of the centrifuge is monitored, controlled and regulated, and cleaned, for example, periodically. The present disclosure relates to utilizing this automated method for preventing clogging and counteracting an imminent clogging in a simple manner by an automatic shifting of the separation zone in the separator drum.

Surprisingly, by using the method of the present disclosure, it is possible to operate the separator closer to its "limit range"; that is, to carry out a preadjustment of the fat concentration in the cream of up to 44% during the normal operation.

The method of the present disclosure is utilized when separating cold milk into cream and skimmed milk. The cold milk has a temperature of 2-15° C., or, for example, 4-10° C., and separated into cream having a fat content of from 28-45% and into skimmed milk. During the cold milk separation, the cream phase tends to assume a consistency similar to butter and will then cause a clogging of a least a portion of the flow paths. Such clogging can be eliminated only at high expenditures and with a loss of time during the production. A closing or clogging occurs as a function of the parameters of the cold milk separation. These parameters include product temperature, the drive capacity and the machine construction, including the disk diameter, the disk thickness, and the cover plate thickness. The blockage typically occurs when processing cold milk of a temperature T=4° C., for example, in the case of a fat content of 45% in the cream. This blockage problem is addressed by the method of the present disclosure.

According to an embodiment of the present disclosure, the separation zone in the drum is shifted toward the interior when the limit value is reached or exceeded, specifically by a throttling of a valve in the skimmed milk outlet. This throttling can take place by a timing unit for a given time period.

As an alternative embodiment, it is within the scope of the present disclosure that the blockage of the drum is prevented by increasing the inflow performance. Also, in accordance with embodiment, a "closing" or a clogging of the drum of the separator by a cream having the firm consistency of butter is prevented in a simple manner. In this case, the inflow rate may be increased within a time period of 5-60 seconds, or, for example, 5-20 seconds. Even such a short change of the operating parameters can effectively prevent the clogging. This particularly applies when the inflow rate is increased by 5-40%, or, for example, 5-20%.

Different measuring methods are possible for determining the fat content. Thus, the determination of the fat content can take place by a mass flow meter, such as with a separate density output. Such measuring devices are offered, for example, by Micro Motion Company.

The present disclosure also relates to a device for implementing the embodiments of the method according to the present disclosure. Such a device has a measuring and control device designed to detect an imminent clogging by a determination of the concentration of the fat content of an outflowing product phase and to change the operating parameters when a given fat content limit value is reached or exceeded. That is done such that a shifting of the separation zone in the separator drum takes place to prevent a clogging for a defined minimum time period. Correspondingly, the separator is a cold milk separator which has a inlet for cold milk as well as an outlet for skimmed milk, and a cream outlet. An analyzer is arranged in the cream outlet, by which the cream concentration, that is, the fat content of the cream, can be determined. According to two embodiments of the device, the analyzer is connected either with a control input of a control valve in the skimmed milk outlet or with a device for controlling the inflow quantity of cold milk into the separator.

Other aspects of the present disclosure will become apparent from the following descriptions when considered in conjunction with the accompanying drawings.

BRIEF DESCRIPTION OF THE DRAWINGS

FIG. 1 is a schematic representation of the separation of cold milk, in accordance with a method of the present disclosure.

FIG. 2 is a schematic representation of a separator for the method of FIG. 1.

DETAILED DESCRIPTION

In an illustrative embodiment, by a separator 2 with a vertical axis of rotation R, cold milk KM, is guided via an inlet 1 into separator 2 or into a separator drum 10, the separator 2 having a drive 3. The cold milk KM is separated in the separator 2 into skimmed milk MM and cream RA constituents and the constituents are discharged from the separator 2 by a skimmed milk outlet 4 and a cream outlet 5, respectively.

In or on outlet 5 for cream RA, an analyzer 6 is inserted or mounted by which a cream concentration, that is, the fat content of the cream RA, is determined. The analyzer 6 is connected with a control device 19 of the separator 2 or is connected directly with a control input of a control valve 7.

When a defined limit value of the fat content, for example, 43% in the cream RA, is exceeded on the analyzer 6, the control valve 7 in the skimmed milk outlet 4 is closed into a defined position.

That value corresponds to an outflow pressure of 0.5% bar below an overflow limit of the separator 2. In this illustrative embodiment, a variably adjustable timer or time unit is running simultaneously, which holds the control valve 7 in the above-mentioned position.

As a result of a fast closing of the control valve 7, a separation zone 20 in the separator 2 or the separator drum 10 is shifted toward an interior. Simultaneously, a resulting pressure increase on the skimmed milk outlet 4 pushes the cream RA away from a center of the drum 10.

After the timer or the time unit has run out, the control valve 7 in the skimmed milk outlet 4 returns into a position which corresponds to a defined cream fat content of, for example, 40%.

As a result of a controlling by the skimmed milk outflow in connection with the defined limit value against a blocking or clogging of the drum 10, the following parameters can be addressed:

an increased cream fat content in the inflow,
a temperature reduction and
an inflow rate reduction.

An embodiment of the drum 10 and a gripper construction of cold milk separator 2 is illustrated in FIG. 2.

The separator 2 is used for the cold-milk separation. Inlet 1 for the cold milk KM leads from below through a screw 8 and a distributor 9 into the separator drum 10, in which a disk stack 11 is arranged and which has a separating disk 12.

In an illustrative embodiment, by a separator 2, cold milk KM, which is guided via inlet 1 into a separator 2 having drive 3, is separated in the separator 2 into skimmed milk MM and cream RA constituents, and the constituents are discharged from the separator 2 by outlets 4 and 5, respectively.

In or on outlet 5 for cream RA, an analyzer 6 is inserted or mounted by which the cream concentration, that is, the fat content of the cream RA, is determined. The analyzer 6 is connected with the control device 19 of the separator 2 or is connected directly with a control input of a control valve 7.

A swirl space 13 in a discharge 16 for skimmed milk MM on separating disk 12, and a regulating disk 14 with a relatively large diameter in comparison to an overflow diameter in a gripper chamber cover 15 in the skimmed milk outlet 4, have an advantageous effect by permitting a preadjustment of a cream concentration of approximately 44% and a throttling of a skimmed milk outflow pressure.

A corresponding drum 10 construction makes possible a large bandwidth for controlling the skimmed milk outflow pressure.

A centripetal pump 17 is used for discharging the skimmed milk MM and a centric collecting pipe 18 in the axis of rotation R is used for discharging the cream RA.

The larger the diameter difference between the regulating disk 14 and overflow edge on the gripper cover 15, the more the separation zone 20 can be changed by a sudden closing of the skimmed milk control valve 4 and the cream RA can be pushed out with more pressure.

In another embodiment of a control and of a method for preventing a clogging of the separator drum 10 in a manner of an antilock system, an "antilock control" takes place by an increase of the inflow rate of the cold milk KM and a resulting pushing-out of the cream RA.

When the limit value of a cream fat content of 43% is exceeded, the inflow rate is, for example, abruptly increased by at least 5,000 l/h. As a result, the cream RA is diluted by approximately 10% and, as a result of a liquid level shift in the drum 10, the cream RA is, in turn, pushed out of the drum 10.

According to the method of the present disclosure, an operation can take place with a previously fixedly adjusted cream concentration of, for example, 40%. The adjustment of the cream concentration takes place by regulating disk 14, which is independent of the skimmed milk outflow pressure purely via the inflow rate.

A controlling via the inflow rate is permissible when processing cold milk KM when no plate apparatus is present which would have to be operated at a constant rate. In this fashion, a regulating by a cream outflow control can be saved. The throttling of the cream quantity is no longer necessary.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A method of preventing blockages of flow paths of a separator, the separator being set to achieve a desired fat content during processing of a fat-containing product such as milk, the method steps comprising:
    determining a concentration of the fat content of an outflowing product phase from the separator to detect an imminent clogging;
    shifting a separation zone in a separator drum of the separator for a defined minimum time period by changing operating parameters when a defined fat content limit value, which is greater than the desired fat content, is one of reached and exceeded to prevent blockages of flow paths of the separator; and
    after the defined minimum time period is reached, the separator is returned to the desired fat content setting.

2. The method according to claim 1, wherein the fat-containing product is cold milk and the cold milk is separated into cream and skimmed milk.

3. The method according to claim 2, wherein the cold milk has a temperature of 2-15° C. and is separated into cream having a fat content of 28-45% and into skimmed milk.

4. The method of claim 2, wherein the cold milk has a temperature of 4°-10° C. and is separated into cream having a fat content of 28-45% and into skimmed milk.

5. The method according to claim 1, wherein the separation zone in the drum is shifted toward an interior of the drum when the fat content limit value has been one of reached and exceeded.

6. The method according to claim 1, wherein the determining of the concentration of the fat content takes place by a mass flow meter.

7. The method according to claim 6, wherein the mass flow meter has a separate density output.

8. The method according to claim 1, wherein the separation zone in the drum is shifted toward an interior of the drum by a throttling of a valve in a skimmed milk outlet.

9. The method according to claim 8, wherein the throttling of the valve in the skimmed milk outlet takes place by a timer for a defined time period.

10. The method according to claim 1, wherein the separation zone is shifted by an increase of an inflow rate.

11. The method according to claim 10, wherein the inflow rate is increased within a time period of from 5-60 seconds.

12. The method according to claim 10, wherein the inflow rate is increased within a time period of from 5-20 seconds.

13. The method according to claim 10, wherein the inflow rate is increased by 5-40%.

14. The method according to claim 10, wherein the inflow rate is increased by 5-20%.

* * * * *